A. G. OLSON & A. A. BOBERG.
HOG SCRAPER.
APPLICATION FILED AUG. 12, 1913.
1,078,211.
Patented Nov. 11, 1913.
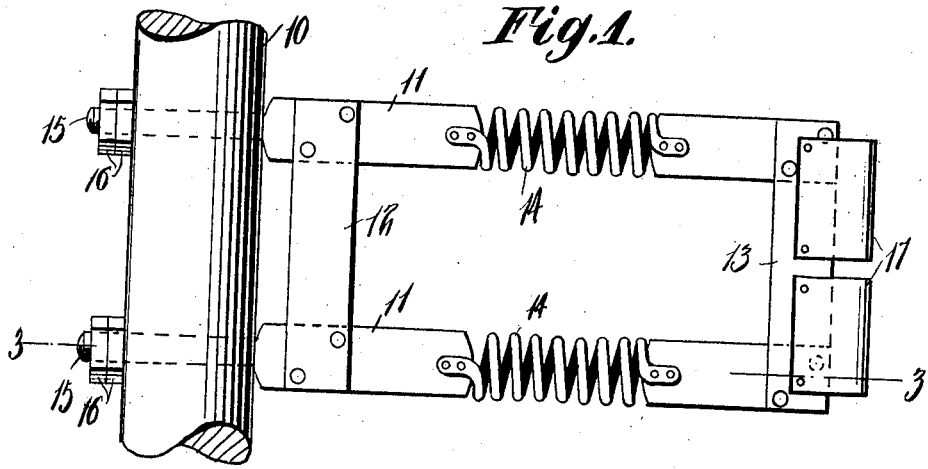
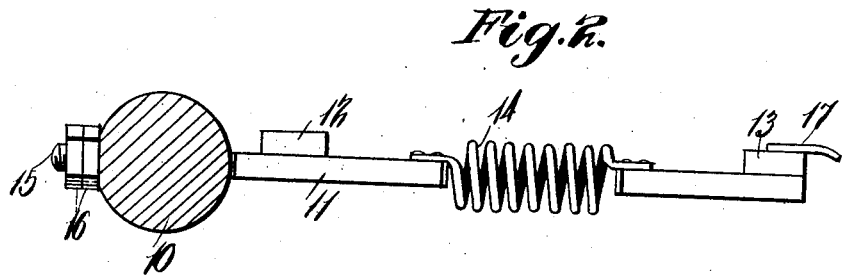
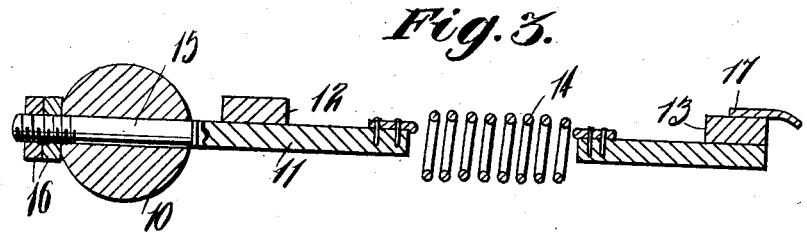
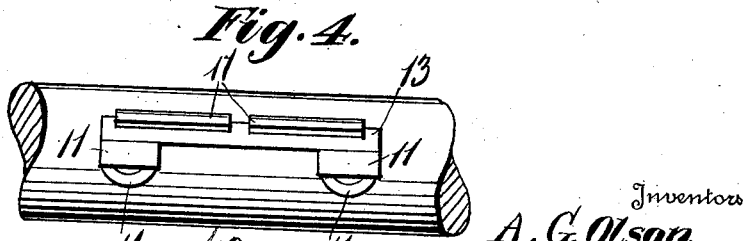
Witnesses
W. C. Fielding
Francis Boyle
Inventors
A. G. Olson
and A. A. Boberg
By
Attorneys
COLUMBIA PLANOGRAPH CO., WASHINGTON, D. C.

UNITED STATES PATENT OFFICE.

ANDREW G. OLSON AND ARTHUR A. BOBERG, OF ST. JOSEPH, MISSOURI.

HOG-SCRAPER.

1,078,211.   Specification of Letters Patent.   Patented Nov. 11, 1913.

Application filed August 12, 1913.   Serial No. 784,383.

*To all whom it may concern:*

Be it known that we, ANDREW G. OLSON and ARTHUR A. BOBERG, citizens of the United States, residing at St. Joseph, in the county of Buchanan, State of Missouri, have invented certain new and useful Improvements in Hog-Scrapers; and we do hereby declare the following to be a full, clear, and exact description of the invention, such as will enable others skilled in the art to which it appertains to make and use the same.

This invention relates to beaters for hog scraping machines and has for an object to provide a beater that will be yielding in construction whereby breakage is prevented.

A further object is to provide a beater that may be constructed at a minimum cost and will be devoid of complicated parts.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a plan view of the beater. Fig. 2 is a side elevation. Fig. 3 is a longitudinal sectional view on the line 3—3 Fig. 1. Fig. 4 is a front elevation.

Referring now to the drawing in which like characters of reference designate similar parts, 10 designates the beater shaft.

In carrying out our invention we provide a beater including a pair of parallel bars 11 that are connected by cross bars 12 and 13, the latter being riveted or otherwise secured in position. Each bar is provided with an intermediate helical spring section 14, these spring sections permitting of the bars yielding in operation so that breakage is prevented. The rear ends of the bars are reduced and formed cylindrical to provide stems 15 which are inserted through suitable openings formed for their reception in the shaft 10, and are secured in place by lock nuts 16. To the forward connecting bar 13 of the bars are secured downwardly curving scraper blades 17, such blades being spaced apart and being riveted or otherwise secured in position.

During rotation of the shaft 10 in the usual manner, the beater will be rotated with a resultant scraping of the bristles from the carcass by the blades 17, while at the same time there will be a yielding of the bars 11 at their intermediate spring portions 14 whereby breakage of the beater when it impinges against the carcass is prevented.

From the above description it will be seen that we have provided an extremely simple and inexpensive beater that will not become easily broken, and which is devoid of complicated parts.

What is claimed, is:—

1. A beater for hog scraping machines including the combination with a beater shaft, of a pair of parallel bars each having an intermediate portion consisting of a helical spring, a cross bar connecting the outer ends of said bar, and scraper blades secured to said cross bar.

2. A beater for hog scraping machines including the combination with a beater shaft, of a pair of parallel bars each having an intermediate portion consisting of a helical spring, cross bars connecting said parallel bars, stems formed on said parallel bars and engaged through openings in said shaft, retaining nuts on said stems, and curved scraper blades carried by one of said cross bars.

In testimony whereof, we affix our signatures in the presence of two witnesses.

ANDREW G. OLSON.
ARTHUR A. BOBERG.

Witnesses:
CHAS. W. BRIGHAM,
EARL T. CAMPBELL.

---

Copies of this patent may be obtained for five cents each, by addressing the "Commissioner of Patents, Washington, D. C."